Dec. 15, 1953  J. M. UNK ET AL  2,662,936
MECHANICALLY DRIVEN SELECTOR SWITCH
Filed June 30, 1950  2 Sheets-Sheet 1
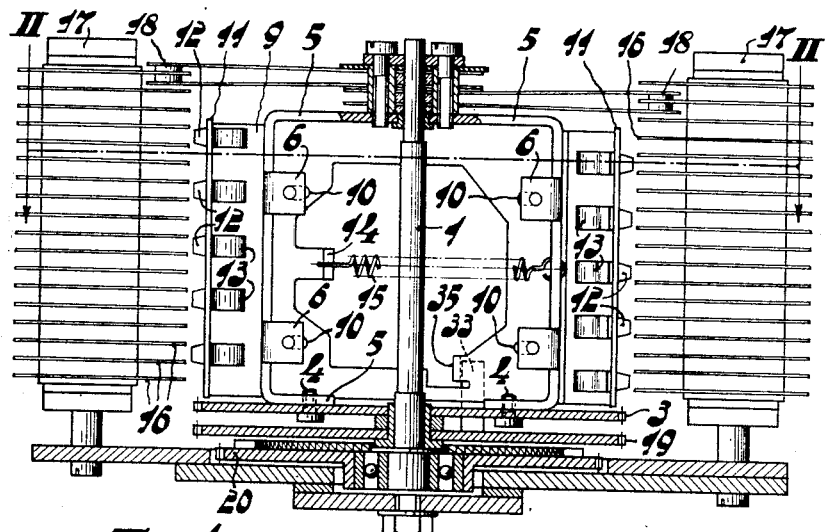
Fig. 1.
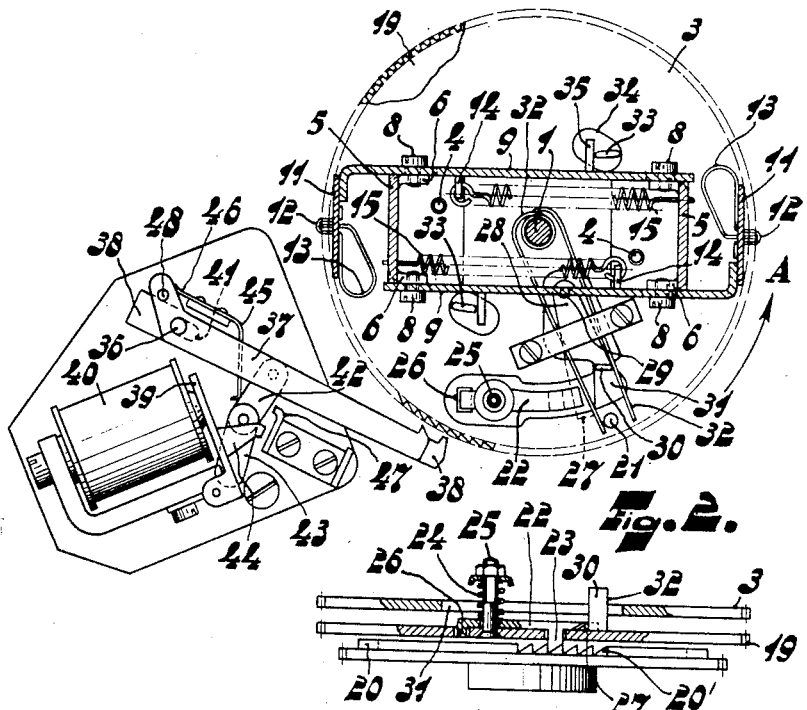
Fig. 2.
Fig. 3.
INVENTORS
JACOB MARINUS UNK
NICOLAAS SCHEFFER
BARTHOLOMEUS MATTHIAS PENNEKAMP
BY
AGENT

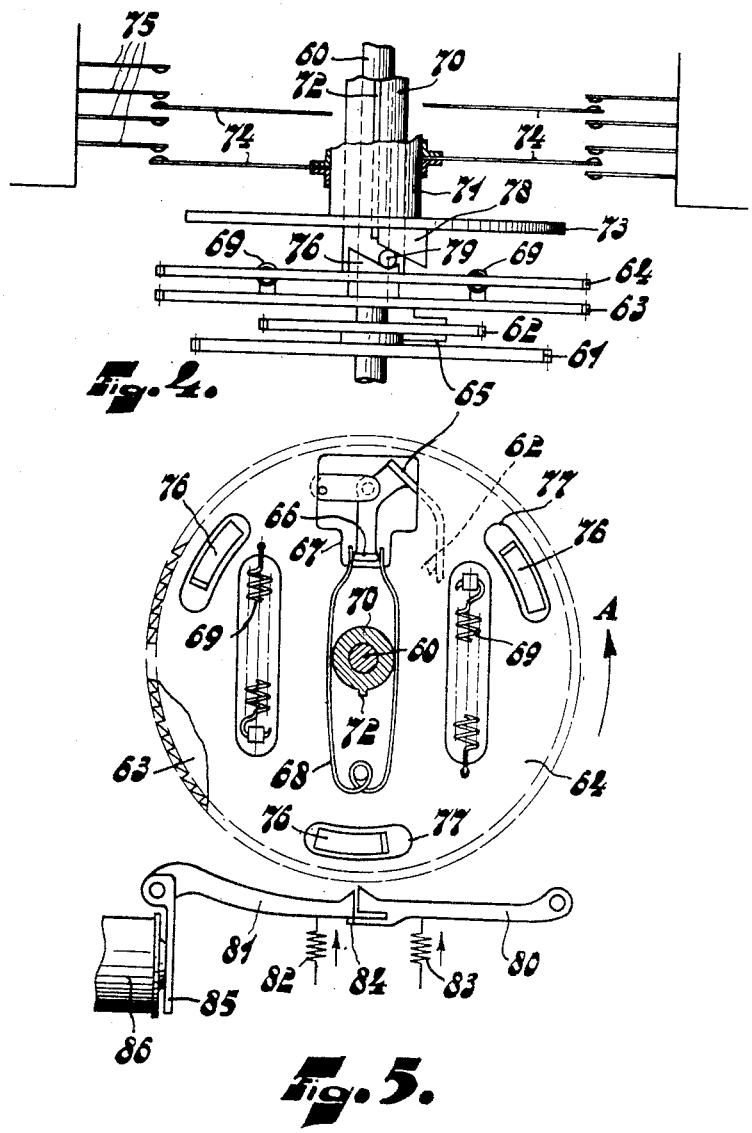

Patented Dec. 15, 1953

2,662,936

UNITED STATES PATENT OFFICE 2,662,936

MECHANICALLY DRIVEN SELECTOR SWITCH

Jacob Marinus Unk, Nicolaas Scheffer, and Bartholomeus Matthias Pennekamp, Hilversum, Netherlands, assignors to Hartford National Bank and Trust Company, Hartford, Conn., as trustee Application June 30, 1950, Serial No. 171,332

Claims priority, application Netherlands July 7, 1949

10 Claims. (Cl. 179—27.51)

This invention relates to mechanically driven selector switches.

Rotary switches for use in automatic telephone systems are known in which the movable part comprising the movable contacts—hereinafter termed wiper carriage—is provided with a thin flexible gear wheel meshing with a rigid gear wheel secured to the rotary driving shaft. If the wiper carriage is required to stop in a contact position, the thin gear wheel is bent out of engagement with the rigid driving gear wheel, by the movement of the armature of an electromagnet, and the wiper carriage is caused to stop. This construction has the disadvantage that comparatively, a considerable period of time elapses between the instant at which the stop signal is passed to the electromagnet and the instant at which the wiper carriage stops. Moreover, this time interval is not equal in all circumstances, so that the position at which the wiper carriage stops is not always the same and at a high speed of the wiper carriage, it sometimes stops past the desired contact position.

Selectors have been devised permitting the wiper carriage to be arrested fairly rapidly, the wiper carriage being driven from a multipolar electric motor with independent reversal of the pole excitation. The wiper carriage is stopped by parallel-connection of the poles of the electric motor. With these selectors, however, the speed of the wiper carriage is limited, since the momentum on stopping may become very considerable. Not only the wiper carriage but also the members transmitting the movement of the usually rapidly rotating armature to the wiper carriage and, moreover, the armature itself are required to stop abruptly. At high speeds of the wiper carriage this requires a robust and consequently expensive construction.

The present invention relates to mechanically driven selector switches, more particularly a switch for use in automatic telephone systems, in which the wiper carriage is coupled to a rotary driving shaft through a disengageable coupling mechanism. It has for its object to provide a construction for such a selector switch, in which a high speed of the wiper carriage is permissible without involving the risk of the wiper shaft stopping in a wrong position after the stop signal is transmitted.

The invention is based on the recognition that a rapid immobilisation of the wiper carriage driven through the coupling mechanism is possible if it is not necessary for the coupling mechanism to be disengaged prior to the wiper carriage being stopped. In this event, the wiper carriage may be arrested immediately on the stop signal being transmitted and only then need the coupling mechanism be disengaged, so that the time required for disengagement is no longer included in the stopping time, i. e. the time interval between the instant at which the stop signal is given and the instant at which the wiper carriage is stopped. With the known switch referred to above comprising a flexible gear wheel, the armature of the magnet is required first to move the flexible gear wheel of the wiper carriage out of engagement with the driving gear wheel before the wiper carriage can be braked or locked without any risk of damage.

According to the invention, a mechanically driven selector switch, more particularly for use in automatic telephone systems, in which the part of the switch comprising the wipers (wiper carriage) is coupled to a driving shaft through a disengageable coupling mechanism, is characterized in that it comprises means permitting the driven (outlet) part of the coupling mechanism together with the wiper carriage to be immobilized in any desired contact position of the wipers and the coupling mechanism is of a type known per se, in which the movement of the driving (inlet) part is transmitted to the driven part by means of an auxiliary member which may be shifted relatively to the driven part against the action of a spring and is connected to the driving part by way of a disengageable coupling which is controlled by shifting the auxiliary member with respect to the driven member of the coupling mechanism, means being provided which, after disengagement of the coupling by relative displacement of the auxiliary member and the driven member due to overloading of the latter, the spring loaded auxiliary member is prevented from moving back.

If, in the switch according to the invention, the wiper carriage is required to be arrested in a contact position, this only requires actuation of the means for arresting the wiper carriage. Not until the wiper carriage has stopped will the connection with the driving part be broken owing to the relative displacement of the still driven auxiliary member and the stationary driven part of the coupling mechanism. The time required therefor may be long or short without in the least affecting the position of the wiper carriage. In the disengaged position, the auxiliary member is subject to the force of a spring also acting upon the wiper carriage. The latter is consistently subject to a force acting in the initial direction of motion, which is absorbed by the arresting means. This has the advantage that the position of the wiper carriage is always determined, since the clearance present in the members is eliminated in the contact position. A further advantage of the construction according to the invention is that the momentum acting on the locking means may be small, since it is exerted only by the wiper carriage and the driven part of the coupling mechanism coupled thereto, which part may structurally be very simple.

In a switch according to the invention, in which the wiper carriage is adapted to rotate, the coupling mechanism and the wiper carriage preferably have a common axis of rotation. This permits a compact construction of the switch so that it occupies less space. Moreover, the number of moving members is small.

The wiper carriage may comprise a part having a profiled edge adapted to co-operate with a movable pawl, hereinafter termed "stop pawl"—by which the wiper carriage is stopped in any desired contact position. If the wiper carriage is rotatable, the said profiled part is preferably a ratchet wheel having a tooth for each contact position of the wiper shaft. Locking of the wiper carriage by means of a pawl co-operating with a profiled part of the wiper cariage has the advantage that for arresting the wiper carriage it is only necessary to move the pawl into its operative position. Since the pawl may have a small mass it may respond swiftly to the stop signal.

In a switch comprising a rotary wiper carriage the gear wheel co-operating with the stop pawl, may at the same time constitute the driven part of the coupling mechanism. This yields a very compact construction having fewer separate members, thus reducing the mass to be stopped and keeping the momentum, on stopping, within reasonable limits even at a high speed of the wiper carriage.

After interruption of the connection to the driving part, the auxiliary member of the coupling mechanism may be prevented from moving back by means of an automatically operating pawl coupling or clamping roller provided between said auxiliary member and a stationary part of the coupling mechanism. Upon releasing the driven part of the coupling mechanism and the wiper carriage, these parts will then move forwards due to the action of the spring acting on them, whilst the auxiliary member is still coupled to the stationary part. In this event, the aforesaid parts might be accelerated such that by the end of the displacement of the spring loaded wiper carriage, the latter moves faster than the auxiliary member meanwhile connected to the driving part of the coupling mechanism. Due to the impact on overtaking the auxiliary member, the wiper carriage is braked, so that the wiper carriage lags behind the auxiliary member for a short time and then overtakes it again. Owing to this, the wiper carriage does not move uniformly at the start, which may entail difficulties on a stop signal being transmitted during this irregular displacement.

In order to avoid this inconvenience in a switch, in which the rotary wiper shaft and auxiliary member are each adapted to be arrested by a pawl the two pawls may be coupled in such manner as to move simultaneously away from and towards the members to be arrested by them. The pawl arresting the auxiliary member (hereinafter termed auxiliary pawl) then releases the auxiliary member at the same instant at which the pawl, co-operating with the wiper carriage (hereinafter termed stop pawl) likewise releases the wiper carriage. Both the auxiliary member and the wiper carriage are now subject only to the spring force acting on the auxiliary member. Since the mass of the auxiliary member is much smaller than that of the wiper carriage, the former will move back, whereas the latter remains stopped. Due to the movement of the auxiliary member, the coupling between the auxiliary member and the driving part of the coupling mechanism is re-established, whereupon the auxiliary member and wiper carriage are carried along together.

To make sure, that in all circumstances the displacement of the auxiliary member re-establishes the coupling between the auxiliary member and the driving part of the coupling mechanism, the construction of the two pawls may be such that, on lifting the auxiliary pawl, the stop pawl is caused to follow, but that the stop pawl releases the member arrested by it only after some delay, so that the previously released auxiliary member moves back before the release of the wiper carriage. In this event, the connection between the auxiliary member and the driving part of the coupling mechanism is re-established, since the previously released auxiliary member is moved back under the action of the spring and only then are both auxiliary member and the meanwhile released wiper carriage driven in a forward direction. The co-operation between the auxiliary pawl and the auxiliary member is such that the auxiliary pawl after the stop pawl has snapped in, prevents the auxiliary member from moving back, but does not hamper the forward movement of the auxiliary member. This may be achieved in a very simple manner by constructing the auxiliary pawl and the co-operating edge of the auxiliary member such that the pawl releases automatically in regard to the forward movement of the auxiliary member and the coupling between the stop pawl and the auxiliary pawl, which may be constituted by a lug of the stop pawl engaging behind the auxiliary pawl, has such an amount of play to permit the auxiliary pawl to follow the profiled edge of the auxiliary member without lifting the stop pawl from the locking position.

The auxiliary pawl may be furnished with a slot through which passes a pin which is secured to the frame of the switch and constitutes the pivot for the pawl. By making the slot extend in a longitudinal direction of the auxiliary pawl and linking the pawl to a toggle lever it is ensured that the toggle lever is able to pass its dead centre position only in the released position of the auxiliary pawl. Past this dead centre position, the toggle lever is retained by a stop, the auxiliary pawl being so constructed as to release automatically in both directions of motion of the auxiliary member. When the auxiliary member moves forward, the toggle lever cannot pass its dead centre position and consequently cannot prevent the motion of the auxiliary member. As soon, however, as the connection between the auxiliary member and the driving part of the coupling mechanism is interrupted, the auxiliary member moves back a little so that the auxiliary pawl is moved back. In this event, the toggle lever prevents a releasing movement of the auxiliary pawl and the auxiliary member is locked against moving further back. In order to actuate the wiper carriage again, the toggle lever is forced back through its dead centre position by external means, for example the armature of an electromagnet, owing to which the auxiliary pawl is lifted and carries along the stop pawl.

With selectors for use in automatic telephone systems, it is known to mount the wiper holder in a movable manner relatively to the remaining parts of the wiper carriage such that the wipers, except those for special purposes, for example test wipers, move freely with respect to the stationary contacts and are made to engage the stationary contacts only after the wiper carriage is stopped in the contact position. In a switch according to the invention, the auxiliary member may advantageously be coupled with the wiper holder in such manner that the displacement of the auxiliary member with respect to the driven part of the coupling mechanism involves the desired movement of the wipers towards and away from the stationary contacts. If, moreover, the auxiliary member is prevented from moving back by means which upon release of the wiper carriage, release the auxiliary member simultaneously with or prior to the wiper carriage, a construction is obtained in which the wipers are made to engage the stationary contacts only when the wiper carriage is in its contact position and, in addition, the wipers are retracted before the wiper carriage is again actuated.

The last-mentioned construction of the switch according to the invention has the advantage that the wipers do not require additional externally controlled operating members, since the movement of these wipers follows or precedes automatically stopping and release of the wiper carriage, respectively.

In order that the invention may be more clearly understood and readily carried into effect it will now be described more fully with reference to the accompanying diagrammatic drawings, given by way of example.

Figs. 1, 2 and 3 show a rotary selector switch according to the invention, comprising radially movable wipers and Figs. 4 and 5, a rotary selector switch according to the invention, in which the wipers are movable in an axial direction.

Fig. 1 is a vertical section.

Fig. 2 is a horizontal section on the line II—II in Fig. 1 of the first-mentioned embodiment.

Fig. 3 is a detail view of the coupling mechanism used therein.

Fig. 4 is a side view, and Fig. 5 is a plan view of the second embodiment in which several parts have been omitted.

Referring now to Figs. 1, 2 and 3, a wiper carriage is adapted to rotate about a shaft 1. The wiper carriage comprises a ratchet wheel 3 and vertical U-shaped supports 5 secured thereto by means of screws 4. The supports 5 are provided with bent tags 6, each furnished with a screw hole. By means of screws 8 engaging these holes, vertical plates 9 are secured on either side of the shaft 1. These plates are furnished with slots 10 through which the screws 8 pass, so that the two plates are movable in their planes in a horizontal direction. Each plate 9 carries at its end an insulating strip 11 constituting a wiper holder, to which the wipers 12 are secured. The wipers consist of bent metal strips which pass through apertures provided in the strips 11 and are forced outwards by springs 13.

Each plate 9 is provided with a bent tag 14 having secured to it a draw spring 15 the other end of which is secured to the support 5 located at the other side of the shaft 1. Consequently, the plates 9 are urged in a direction such that the wipers 12 are drawn away from the opposite stationary contacts 16 of the switch. These stationary contacts 16 form part of the semi-cylindrical contact bank 17 arranged co-axially with the shaft 1.

At the top, the wiper carriage frame comprising the supports 5, is provided with test wipers 18, each of which co-operates with one of the two upper rows of stationary contacts of the contact bank 17.

Below the ratchet wheel 3 of the wiper carriage are provided a ratchet wheel 19 and a gear wheel 20 which are also rotatable about the shaft 1. The wheels 3, 19 and 20 form part of a disengageable coupling mechanism, the wheel 3 constituting the driven (outlet) part, the wheel 19 being an auxiliary member and the wheel 20 constituting the driving (inlet) part of the coupling mechanism.

The gear wheel 20 is driven by a coupling to a driving shaft (not shown). On the auxiliary member 19 is mounted a coupling pawl 22 (Fig. 3) a lug 23 of which extends downwards through an aperture provided in the wheel 19. The lug 23 co-operates with a ring of pawl teeth 20' projecting upwards from the gear wheel 20. The coupling pawl 22 is kept in place by means of a spring 24 provided on a screw 25 of the auxiliary member 19. The end of the pawl 22 remote from the lug 23 is bent over and rests in an aperture 26 in the auxiliary member 19. The end of the pawl 22 nearer the lug 23 is bevelled at an angle of approximately 45° and co-operates with the end 27 of a pawl 28, which end is also bevelled at an angle of approximately 45°. The pawl 28 is rotatable about a pin 29 secured to the auxiliary member 19 and has an upstanding part 30 engaging an aperture 31 provided in the ratchet wheel 3. Above the wheel 3 is provided a hairpin spring 32 which several times encircles the shaft 1 and the ends of which co-operate with the part 30 of pawl 28 and a pin 21 of gear 3.

The auxiliary member 19 has two projecting parts 33 each of which extends through an aperture 34 of ratchet wheel 3 and each of which co-operates with a tag 35 bent perpendicularly out of a plate 9.

Both the ratchet wheel 3 and the auxiliary member 19 are provided with peripheral teeth, those of the ratchet wheel 3 pointing in the normal direction of rotation A (Fig. 2) of the wiper carriage and those of the auxiliary member 19 being symmetrical. These teeth co-operate with pawls 37, and 38 supported from the frame of the selector and both adapted to rotate about a shaft 36. These pawls are actuated by an armature 39 of the stopping magnet 40. The pawl 37 (stop pawl) has a pointed end and has for its purpose to arrest the ratchet wheel 3 and consequently the wiper carriage in any desired contact position. It is arranged in such manner and the teeth of the ratchet wheel 3 are so arranged that on this gear being locked, a series of wipers 12 is stopped opposite a vertical row of stationary contacts 16.

The portion of the pawl 38 (auxiliary pawl) co-operating with the peripheral teeth of the auxiliary member 19 is trapezoidal, so that the pawl releases automatically i. e. that when the pawl co-operates with the auxiliary member the latter urges the pawl outwards. The pawl 38 is provided with a slot 41 so that it is able to shift to a limited degree in its longitudinal direction. By means of a toggle lever comprising the parts 42 and 43 which are hinged together and pivotally secured to the auxiliary pawl 38 and to the frame of the selector respectively, the pawl 38 can be moved away from the auxiliary member 19 by a lever 44 secured to the armature 39 of the magnet 40. A spring 45 also secured to the selector frame urges the toggle lever 42 and 43 towards the lever 44 or beyond this position, so that part 42 engages the stationary stop 47. A spring 46 co-operates with the stop pawl 37 to urge it into a position in which it co-operates with the ratchet wheel 3. The stop pawl 37 is provided with a pin 48 which extends downwards beside the auxiliary pawl 38, so that the stop pawl 37 snaps into the ratchet wheel 3 only if the auxiliary pawl 38 is moved towards the periphery of the auxiliary member 19.

The selector described above operates as follows:

When the armature 39 of magnet 40 is attracted, the pawls 37 and 38 are lifted away from the associated wheels 3 and 19. The rotary motion of gear wheel 20 is transmitted to the auxiliary member 19 due to co-operation of the coupling pawl 22 with the gear wheel 20. This motion is transmitted to the wiper carriage by way of the projections 33 and tags 35. Consequently, the test wipers 18 wipe the two rows of stationary test contacts of the contact bank 17. If one of these wipers 18 engages a test contact, the voltage of which is an indication that the wiper carriage is required to be stopped in the contact position corresponding to this contact, the magnet 40 is de-energized, due to which the armature 39 assumes its rest position. The two pawls 37 and 38 are no longer lifted and are urged by springs 45, 46 towards the periphery of wheels 3 and 19. The stop pawl 37 snaps in immediately with the result that the ratchet wheel 3 is locked and the wiper carriage is arrested. The auxiliary pawl 38 snaps in, it is true, but since this pawl is carried along a little in the direction of rotation of wheel 19 and, moreover, releases automatically, the wheel 19 is not locked, consequently, the auxiliary member 19 continues to be driven by gear wheel 20 and is shifted relatively to the locked wheel 3. Due to this the projecting parts 33 initially push the two plates 9 forward against the action of springs 15, so that the insulating strips 11 are forced radially outwards and the wipers 12 are made to engage those opposite stationary contacts which are opposite the stationary wipers. Secondly, the part 30 of pawl 28 shifts in the aperture 31 until further movement of part 30 is prevented by the right-hand wall of this aperture. Further rotation of the auxiliary member 19 results in that pawl 28 is shifted relatively to this member, due to which the bevelled end 27 is moved underneath the end of the coupling pawl 22 and the latter is lifted. Thus, the connection between the gear wheel 20 and the auxiliary member 19 is interrupted, due to which the auxiliary member 19 is subject only to the torque exerted by springs 15. The auxiliary member will turn back slightly, the auxiliary pawl 38 being moved back in its longitudinal direction. The toggle lever 42 and 43 under the action of spring 45 is urged against the stop 47 in or past the dead centre position. In this case, the auxiliary member 19 can no longer force the pawl 38 outwards and further return movement of the auxiliary member 19 is prevented. During the slight return movement of the auxiliary member 19, preceding the locking by the auxiliary pawl 38, the coupling pawl 22 remains lifted. The edge of the aperture 31 does release the upstanding part 30 of pawl 28 but the hairpin spring 32 provides that the end 27 of pawl 28 remains underneath the end of the coupling pawl 22.

The wiper carriage is locked very rapidly after the signal from the test wiper is received. It is only necessary that the stop pawl 37 is released and snaps into the ratchet wheel 3. Not until then is the connection between the driving part of the coupling mechanism and the wiper carriage interrupted by the displacement of the auxiliary member 19 relatively to the stopped ratchet wheel 3. During this relative displacement, the wipers are at the same time displaced radially and made to engage said stationary contacts, thus establishing the desired electrical connections. The stopping time of the wiper carriage i. e. the time elapsing between the instant the stop signal from the test wiper is transmitted and the instant at which the wiper carriage stops, is consequently very short. This time does not, as with said known selectors, include the time necessary for interrupting the connection between the driving shaft and the wiper carriage. The short stopping time permits the wiper carriage to be rotated rapidly and yet to be arrested in the correct position. At the same time, the momentum exerted on the stop pawl 37 upon locking is reduced, since in this case only the mass of the wiper carriage and not also that of the whole driving mechanism is required to be stopped.

When the connection established through the selector is required to be interrupted, the magnet 40 is again energized and the armature 39 is attracted, the lever 44 causing the toggle lever 42, 43 to move back. The auxiliary pawl 38 is rapidly disengaged from the ratchet wheel 19 due to automatic release and by the parts 42, 43. The auxiliary member 19 is now able to turn back under the action of the springs 15. Upon this rotation, the pawl 28 is finally removed from beneath the coupling pawl 22 by the left-hand wall of the aperture 31 of ratchet wheel 3, due to which the coupling pawl 22 re-establishes the connection between the auxiliary member and the gear wheel 20. The return of the auxiliary member 19 also results in that the plates 9 are moved back by springs 15, so that the wiper contacts 12 are disengaged from the stationary contacts of bank 17. The pawls 37 and 38 are so constructed, that the stop pawl 37 is carried along by means of the pin 48 only when the auxiliary pawl 38 is free from the auxiliary member 19. Consequently, upon energisation of the magnet 40, first the auxiliary member 19 is released so that it turns back and only then is the wiper carriage released. After re-establishing the connection between the auxiliary member 19 and the gear wheel 20 the wiper carriage is again driven.

Figs. 4 and 5 represent a switch according to the invention constructed as a selector switch, the wipers in the contact position of the wiper carriage being made to engage the corresponding stationary contacts by an axial movement. Similarly to the selector shown in Figs. 1, 2 and 3, the coupling mechanism through which the wiper carriage is driven, is arranged co-axially with the selector shaft 60. On the shaft 60 is freely rotatable the inlet part of the coupling mechanism, which part is coupled to the driving shaft (not represented). This inlet part comprises a gear wheel 61 and associated ratchet wheel 62.

Above them are provided an auxiliary member 63 and the outlet part of the coupling mechanism comprising a ratchet wheel 64. Both the auxiliary member 63 and the ratchet wheel 64 are furnished with peripheral pawl teeth. Those of the latter point in the normal direction of rotation A of the selector, whereas those of the former point in the opposite direction. The auxiliary member 63 carries a rotatable coupling pawl 65 associated with the ratchet wheel 62. The pawl 65 comprises a bent part 66 standing up through an aperture 67 provided in ratchet wheel 64. The part 66 co-operates with a hairpin spring 68 secured to the ratchet wheel 64.

The auxiliary member 63 and the ratchet wheel 64 are coupled together by draw springs 69. The wheel (outlet) 64 carries a bush 70 which surrounds the shaft 60 and to the upper end of which the test wipers (not shown) are secured. The bush 70 is loosely surrounded by a bush-shaped wiper holder 71. The latter is adapted to slide over the bush 70 in the axial direction of the shaft 60, but angular displacement with respect to this bush is prevented by a wedge 72 extending in the axial direction of the shaft 60 and engaging a corresponding internal slot provided in the wiper holder 71. The latter is connected at its lower end to a disc 73 located above the ratchet wheel 64. The wiper holder and the disc 73 are depressed by the action, in an axial direction, of a spring (not shown). In the lowest position of the wiper holder, as shown, the wipers 74 are so arranged as to be located between horizontal rows of stationary contacts 75 and do not make contact with them upon rotation of the wiper holder.

The auxiliary member 63 is provided with three lugs 76 extending perpendicularly to its plane and through apertures 77 provided in ratchet wheel 64 above the surface of the latter. In Fig. 4 only the foremost of these lugs is shown. The lugs are furnished with a terminal surface sloping downwards in the direction of rotation A of the selector. The lugs 76 co-operate with lugs 78 provided at the bottom side of the disc 73 and also having a sloping terminal surface. A roller or ball 79 is provided between each pair of lugs 76 and 78 located opposite one another.

The ratchet wheel 64 co-operates with a stop pawl 80 adapted to prevent rotation of this ratchet wheel 64 in the direction A. An auxiliary pawl 81 is arranged to co-operate with the auxiliary member 63. Upon co-operation with the edge of the auxiliary member 63 the pawl 81 prevents the latter from returning. However, a forward movement of the auxiliary member 63 is not prevented, since in this direction of rotation, the auxiliary pawl 81 is lifted by the teeth of the auxiliary member. By the action of compression springs 82, 83 represented diagrammatically, the two pawls 80 and 81 are urged into the operative position. The stop pawl 80 is provided with a lug 84 which engages behind the auxiliary pawl 81. The pawl 81 is connected to the armature 85 of an electromagnet 86. When the magnet is energized it maintains the pawls 80 and 81 free from the ratchet wheel 64 and the auxiliary member 63, respectively.

The selector described above operates as follows: In the position shown, the armature 85 being attracted, the auxiliary member 63 and the ratchet wheel 64 can rotate freely. The coupling mechanism is engaged and the rotary motion of the inlet gear wheel 61 is transmitted through the auxiliary member 63 and springs 69 to the wiper holder 71. The latter occupies its lowermost position in which the wipers 74 are not in contact with the stationary contacts 75.

If the selector is required to be stopped, the magnet 86 is de-energized so that pawls 80 and and 81 are urged into their operative positions, the stop pawl 80 immediately arresting the ratchet wheel 64 and consequently also the wiper holder 71. However, the auxiliary member 63 persists in its motion, the auxiliary pawl 81 being lifted by each tooth of the auxiliary member. Since the lug 84 lies behind the end of the auxiliary pawl 81, the pawl 81 is adapted to perform this movement without carrying along the stop pawl 80.

Upon the relative displacement of the auxiliary member 63 and the disc 73, the lugs 76 move under the lugs 78 of the disc 73, the balls or rollers 79 passing over the sloping end surfaces of the lugs located opposite to one another. Due to this, the wiper holder 71 is shifted axially of the shaft 60 and the wipers 74 engage the stationary contacts 75 which are above the stationary wipers.

Due to displacement of the auxiliary member 63 the part 66 of the coupling pawl 65 engages the left-hand limb of the hairpin spring 68 which now tends to lift the pawl 65. The pressure exerted by the teeth of gear 62 prevents this lifting until the pawl 65 is lifted by the edge of the aperture 67, with the result that the connection between the inlet part and the outlet part of the coupling mechanism is interrupted. The auxiliary member 63 is now subject only to the torque of the loaded springs 69 acting against the direction of rotation. However, a return movement of the auxiliary member is prevented by the auxiliary pawl 81, so that the wiper holder 71 remains in its lifted position.

In order to interrupt the electrical connections established and to drive again the wiper holder 71, the magnet 86 is energized, the pawl 81 being lifted and, immediately after, the stop pawl 80 being carried along. However, the auxiliary member 63 is released first with the result that it is turned back by the springs 69. The wiper holder descends, so that the wipers 74 are disengaged from the stationary contacts 75. Upon the return movement of the auxiliary member 63, the pressure exerted by the hairpin spring 68 on the part 66 of the coupling pawl 65 also changes such that the pawl 65 is urged into its operative position. Thus, the connection between the inlet part and the outlet part of the coupling mechanism is re-established and, since the pawl 81 has meanwhile carried along the stop pawl 80, the wiper holder is made to rotate.

In the selector shown in Figs. 3 and 4 the time elapsing between the stop signal and the instant wiper holder stops opposite the desired stationary contacts is very short, due to the immediate locking of the wiper holder and subsequent disengagement of the coupling mechanism so that the selector is suitable for high speed rotation.

In the embodiments described above, the auxiliary pawl is actuated directly by the armature of an electromagnet, the stop pawl being controlled by coupling this pawl to the auxiliary pawl. Thus, the stop pawl cannot move more quickly than the auxiliary pawl to the locking position. The stopping time may be reduced by providing that the stop pawl is controlled by the armature of the electromagnet and a lug of the auxiliary pawl engages behind the stop pawl in such manner that, on lifting the stop pawl, the auxiliary pawl is lifted as well. The speed at which the stop pawl snaps in is then determined only by the mass of stop pawl and magnet armature and by the value of the spring pressure acting on the stop pawl, so that the mass of the auxiliary pawl is no longer of importance in relation to the stop part. The fact, that in this construction, the auxiliary member and the wiper carriage are released simultaneously is less objectionable than may at first appear, since as a rule, the momentum of the auxiliary member is small relatively to that of the wiper carriage. If both members are released simultaneously, the auxiliary member is set into motion while the wiper carriage still remains in place.

What we claim is:

1. A mechanically driven selector switch comprising a plurality of rotatable wipers, first means to move said wipers into and out of engagement with a plurality of contacts, disengageable coupling means operatively connecting said wipers to a driving shaft, said coupling means comprising a driving member connected to said driving shaft, a driven member driving said wipers and an auxiliary member for transmitting motion from said driving member to said driven member, a pair of sequentially operating stop members, the first stop member acting on said driven member to prevent rotation of said wipers, means on said auxiliary member which act on said first means after said driven member has been acted upon to move said wipers into engagement with the contacts, means for spring loading said auxiliary member after said driven member has been acted upon, the second stop member acting on said auxiliary member to prevent said member from moving back under the spring load, and controllable means for sequentially releasing said stop members.

2. A mechanically driven selector switch comprising a plurality of wipers, a wiper carriage means mounting said wipers for rotation, second means to move said wipers into and out of engagement with a plurality of contacts, disengageable coupling means having a common axis of rotation with said carriage means and connecting said carriage means to a driving shaft, said coupling means comprising a driving member connected to said shaft, a driven member driving said carriage means and an auxiliary member for transmitting motion from said driving member to said driven member, a pair of sequentially operating stop members, the first stop member acting on said driven member to prevent rotation of said wipers, means on said auxiliary member which act on said second means after said driven member has been acted upon to move said wipers into engagement with the contacts, means for spring loading said auxiliary member after said driven member has been acted upon, the second stop member acting on said auxiliary member to prevent said member from moving back under the spring load, and controllable means for sequentially releasing said stop members.

3. A mechanically driven selector switch comprising a plurality of wipers, wiper carriage means mounting said wipers for rotation, second means to move said wipers into and out of engagement with a plurality of contacts, disengageable coupling means connecting said carriage means to a driving shaft, said coupling means comprising a driving member connected to said shaft, a driven ratchet wheel member driving and forming part of said carriage means and an auxiliary member for transmitting motion from said driving member to said driven member, a pair of sequentially operating stop pawl members, the first stop pawl member acting on peripheral teeth provided on said driven ratchet wheel member to prevent rotation of said wipers, means on said auxiliary member which act on said second means after said driven ratchet wheel member has been acted upon to move said wipers into engagement with the contacts, means for spring loading said auxiliary member after said driven ratchet wheel member has been acted upon, the second stop pawl member acting on said auxiliary member to prevent said member from moving back under the spring load, and controllable means for sequentially releasing both said stop pawl members.

4. A mechanically driven selector switch comprising a plurality of wipers, wiper carriage means mounting said wipers for rotation, second means to move said wipers into and out of engagement with a plurality of contacts, disengageable coupling means connecting said carriage means to a driving shaft, said coupling means comprising a driving member connected to said shaft, a driven ratchet wheel member driving and forming part of said carriage means and an auxiliary ratchet wheel member for transmitting motion from said driving member to said driven member, a pair of sequentially operating stop pawl members, the first stop pawl member acting on peripheral teeth provided on said driven ratchet wheel member to prevent rotation of said wipers, means on said auxiliary member which act on said second means after said driven member has been acted upon to move said wipers into engagement with the contacts, means for spring loading said auxiliary member after said driven member has been acted upon, the second stop pawl member acting on peripheral teeth provided on said auxiliary member to prevent said member from moving back under the spring load, means connecting said two stop pawl members to move them simultaneously toward or away from the members to be acted upon, and controllable means for sequentially releasing first said second stop pawl member and then said first stop pawl member.

5. A mechanically driven selector switch comprising a plurality of wipers, wiper carriage means mounting said wipers for rotation, second means to move said wipers into and out of engagement with a plurality of contacts, disengageable coupling means connecting said carriage means to a driving shaft, said coupling means comprising a driving member connected to said shaft, a driven ratchet wheel member driving and forming part of said carriage means and an auxiliary ratchet wheel member for transmitting motion from said driving member to said driven member, a pair of sequentially operating stop pawl members, the first stop pawl member acting on peripheral teeth provided on said driven ratchet wheel member to prevent rotation of said wipers, means on said auxiliary member which act on said second means after said driven member has been acted upon to move said wipers into engagement with the contacts, means for spring loading said auxiliary member after said driven member has been acted upon, the second stop pawl member acting on peripheral teeth provided on said auxiliary member to prevent said member from moving back under the spring load, said second stop pawl member being pivoted about a stationary pin, a slot in said second stop pawl member for said pin, said second stop pawl member being movable in a longitudinal direction with respect to said pin throughout the length of the slot, a toggle lever connected to said second stop pawl member, a stationary stop located on one side of said toggle lever which prevents said lever from moving into its dead center position until said pin engages a predetermined part of said slot, and controllable means for sequentially releasing said stop members.

6. A mechanically driven selector switch comprising a plurality of rotatable wipers, first means to move said wipers into and out of engagement with a plurality of contacts, disengageable coupling means connecting said wipers to a driving shaft, said coupling means comprising a driving member connected to said shaft, a driven member driving said first means and an auxiliary member for transmitting motion from said driving member to said driven member, a pair of sequentially operating stop members, the first stop member acting on said driven member to prevent rotation of said wipers, means on said auxiliary member which act on said first means after said driven member has been acted upon to move said wipers into engagement with the contacts, means for spring loading said auxiliary member after said driven member has been acted upon, the second stop member acting on said auxiliary member to prevent said member from moving back under the spring load, means connecting said two stop members to move them simultaneously toward or away from the members to be acted upon, electromagnet means having an armature coupled to said second stop members, and spring means acting against both said stop members in a direction opposite to that force exercised by said electromagnet upon selectively controllable energization.

7. A mechanically driven selector switch comprising a plurality of wipers, wiper carriage means mounting said wipers for rotation, second means forming part of said carriage means to move said wipers a limited extent in a radial direction into and out of engagement with a plurality of contacts, disengageable coupling means having a common axis of rotation with said carriage means and connecting said carriage means to a driving shaft, said coupling means comprising a driving member connected to said shaft, a driven member driving said carriage means and an auxiliary member for transmitting motion from said driving member to said driven member, a pair of sequentially operating stop members, the first stop member acting on said driven member to prevent rotation of said wipers, lug means on said auxiliary member which are rotatable about said common axis of rotation and which act on said second means after said driven member has been acted upon to move said wipers into engagement with the contacts, means for spring loading said auxiliary member after said driven member has been acted upon, the second stop member acting on said auxiliary member to prevent said member from moving back under the spring load, and controllable means for sequentially releasing said stop members.

8. A mechanically driven selector switch comprising a plurality of wipers, wiper carriage means mounting said wipers for rotation, plate means forming part of said carriage means which plate means are movable in its plane to a limited extent in a radial direction to move said wipers into and out of engagement with a plurality of contacts, said plate means carrying said wipers, disengageable coupling means having a common axis of rotation with said carriage means and connecting said wipers to a driving shaft, said coupling means comprising a driving member connected to said driving shaft, a driven member driving said carriage means and an auxiliary member for transmitting motion from said driving member to said driven member, a pair of sequentially operating stop members, the first stop member acting on said driven member to prevent rotation of said wipers, lug means on said auxiliary member which are rotatable about said common axis and which act on a projecting part of said plate means after said driven member has been acted upon to move said wipers into engagement with the contacts, means for spring loading said auxiliary member after said driven member has been acted upon, the second stop member acting on said auxiliary member to prevent said member from moving back under the spring load, and controllable means for sequentially releasing said stop members.

9. A mechanically driven selector switch comprising a plurality of wipers, wiper carriage means mounting said wipers for rotation, second means to move said wipers into and out of engagement with a plurality of contacts, disengageable coupling means having a common axis of rotation with said carriage means and connecting said carriage means to a driving shaft, said coupling means comprising a driving member connected to said shaft, a driven member driving said carriage means and an auxiliary member for transmitting motion from said driving member to said driven member, a pair of sequentially operating stop members, the first stop member acting on said driven member to prevent rotation of said wipers, lug means actuated by said auxiliary member which are rotatable about said common axis of rotation and have an end surface beveled in one direction and which cooperate, after said driven member has been acted upon, with lug means on said second means which also have an end surface beveled in the same direction, to shift said carriage in an axial direction to move said wipers into engagement with the contacts, means for spring loading said auxiliary member after said driven member is stopped, the second stop member acting on said auxiliary member to prevent said member from moving back under the spring load, and controllable means for sequentially releasing said stop members.

10. A mechanically driven selector switch comprising a plurality of wipers, wiper carriage means mounting said wipers for rotation, second means to move said wipers into and out of engagement with a plurality of contacts, disengageable coupling means having a common axis of rotation with said carriage means and connecting said carriage means to a driving shaft, said coupling means comprising a driving member connected to said shaft, a driven member driving said carriage means and an auxiliary member for transmitting motion from said driving member to said driven member, a pair of sequentially operating stop members, the first stop member acting on said driven member to prevent rotation of said wipers, lug means on said auxiliary member which are rotatable about said common axis of rotation and have an end surface beveled in one direction and which extend through an aperture in the driven member to cooperate, after said driven member has been acted upon, with an end surface beveled in the same direction on lug means on said second means, to shift said carriage in an axial direction to move said wipers into engagement with the contacts, roller means being provided between said beveled surfaces, means for spring loading said auxiliary member after said driven member has been acted upon, the second stop member acting on said auxiliary member to prevent said member from moving back under the spring load, and controllable means for sequentially releasing said stop members.

JACOB MARINUS UNK.
NICOLAAS SCHEFFER.
BARTHOLOMEUS MATTHIAS PENNEKAMP.

References Cited in the file of this patent

UNITED STATES PATENTS

| Number | Name | Date |
| --- | --- | --- |
| 1,461,212 | Dobbin | July 10, 1923 |
| 2,135,015 | Richter | Nov. 1, 1938 |
| 2,146,228 | Richter | Feb. 7, 1939 |
| 2,194,051 | Muller | Mar. 19, 1940 |
| 2,286,328 | Baker | June 16, 1942 |

FOREIGN PATENTS

| Number | Country | Date |
| --- | --- | --- |
| 57,938 | Denmark | Sept. 2, 1940 |
| 906,205 | France | Dec. 27, 1945 |